United States Patent
Chang et al.

(10) Patent No.: US 10,846,004 B2
(45) Date of Patent: Nov. 24, 2020

(54) MEMORY MANAGEMENT SYSTEM AND MEMORY MANAGEMENT METHOD FOR DYNAMIC MEMORY MANAGEMENT BY MONITORING WHETHER MEMORY IS ACCESSED AND PREDICTING WHEN MEMORY IS TO BE ACCESSED

(71) Applicant: MEDIATEK INC., Hsin-Chu (TW)

(72) Inventors: Chia-Wei Chang, Hsin-Chu (TW); Shih-Hung Yu, Hsin-Chu (TW); Chieh-Lin Chuang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/402,198

(22) Filed: May 2, 2019

(65) Prior Publication Data
US 2019/0339892 A1    Nov. 7, 2019

Related U.S. Application Data

(60) Provisional application No. 62/666,174, filed on May 3, 2018.

(51) Int. Cl.
*G06F 3/06* (2006.01)
*G06N 20/00* (2019.01)

(52) U.S. Cl.
CPC .......... *G06F 3/0634* (2013.01); *G06F 3/0625* (2013.01); *G06F 3/0653* (2013.01); *G06F 3/0659* (2013.01); *G06F 3/0673* (2013.01); *G06N 20/00* (2019.01)

(58) Field of Classification Search
CPC .... G06F 3/0634; G06F 3/0625; G06F 3/0659; G06F 3/0673; G06F 3/0653; G06F 12/02; G06F 11/3419; G06F 11/3466; G06F 11/3037; G06F 1/3287; G06F 1/3275; G06F 2212/1028; G06F 2212/502; G06F 2212/454; G06F 12/0875; G06N 20/00; Y02D 10/00
USPC ........ 711/154, 137, 213; 712/207, 233, 237; 7/300; 713/300

See application file for complete search history.

(56) References Cited

U.S. PATENT DOCUMENTS

| | | | |
|---|---|---|---|
| 2003/0145239 A1* | 7/2003 | Kever .................... | G06F 1/3275 713/300 |
| 2014/0310479 A1* | 10/2014 | Hooker ............... | G06F 12/0862 711/137 |
| 2015/0317249 A1* | 11/2015 | Chung .................. | G06F 12/126 711/3 |
| 2016/0154589 A1* | 6/2016 | Takeda .................. | G06F 3/0683 711/117 |
| 2019/0104178 A1* | 4/2019 | Sukhomlinov ........... | G06F 9/46 |

* cited by examiner

*Primary Examiner* — Hong C Kim
(74) *Attorney, Agent, or Firm* — Winston Hsu

(57) ABSTRACT

A memory management system includes a memory, a processor, a memory access monitoring module and a memory management module. The processor is used to access the memory. The memory access monitoring module includes a first terminal coupled to the processor, and a second terminal coupled to the memory. The memory access monitoring module is used to monitor whether the processor has accessed the memory so as to generate monitor data. The memory management module is used to receive the monitor data and predict when the memory is to be accessed according to at least the monitor data.

14 Claims, 4 Drawing Sheets

MEMORY MANAGEMENT SYSTEM AND MEMORY MANAGEMENT METHOD FOR DYNAMIC MEMORY MANAGEMENT BY MONITORING WHETHER MEMORY IS ACCESSED AND PREDICTING WHEN MEMORY IS TO BE ACCESSED

CROSS REFERENCE TO RELATED APPLICATIONS

This application claims priority to provisional Patent Application No. 62/666,174, filed May 3, 2018, and incorporated herein by reference in its entirety.

BACKGROUND

In the field of memory, a heterogeneous architecture may be used. The heterogeneous architecture includes a first memory along with a second memory. For example, the first memory may be more inexpensive, operate more slowly, have a larger storage capacity and consume more power than the second memory.

In order to balance efficiency and cost, some data and programs may be stored in the abovementioned first memory instead of the second memory. By means of this sort of heterogeneous architecture, performance may be improved without excessively increasing memory cost. However, several problems have been observed. When a larger, slower and more power-consuming memory is not needed to be used, the memory may still be unnecessarily turned on. This will lead to excessive power consumption.

FIG. 1 illustrates a time diagram of turning on/off a memory according to prior art. In FIG. 1, a horizontal axis corresponds to time, and a vertical axis corresponds to power provided to the memory. As shown in an example of FIG. 1, at a time t1, an application is started, and the memory (e.g., the abovementioned first memory) is thus powered and turned on. At a time t2, the application is deactivated, and the memory is thus turn off. The memory may be turned on for a time interval T11. However, during the time interval T11, the memory may not be accessed all the time. In other words, the memory may be unnecessarily turned on and consume excessive power. In addition, a solution is being sought to improve an operation speed of a heterogeneous architecture.

SUMMARY

An embodiment discloses a memory management system including a memory, a processor, a memory access monitoring module and a memory management module. The processor is used to access the memory. The memory access monitoring module includes a first terminal coupled to the processor, and a second terminal coupled to the memory. The memory access monitoring module is used to monitor whether the processor has accessed the memory so as to generate monitor data. The memory management module is used to receive the monitor data and predict when the memory is to be accessed according to at least the monitor data.

Another embodiment discloses a memory management method. The memory management method includes monitoring whether a processor has accessed a memory so as to generate monitor data; predicting when the memory is to be accessed by the processor according to the monitor data; and turning on the memory in a bit advance when the memory is predicted to be accessed. Contrariwise, a best time may be predicted to turn off the memory to save power.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
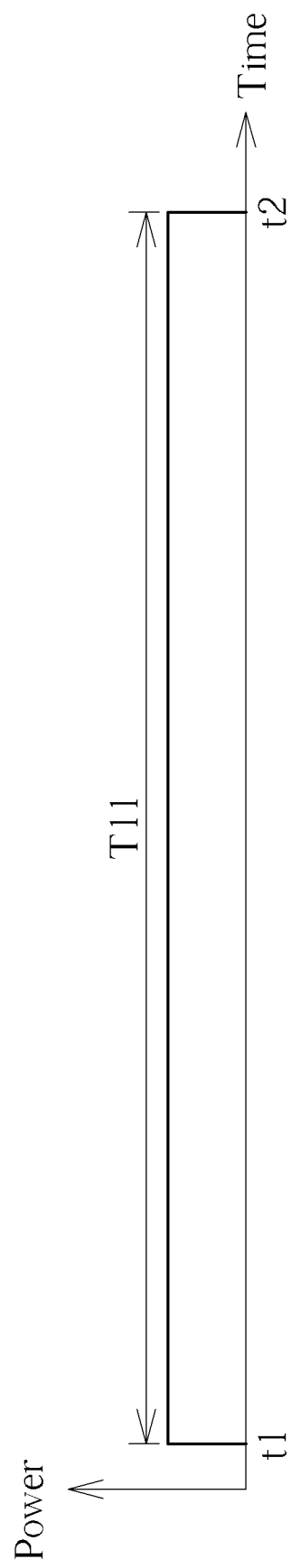
FIG. 1 illustrates a time diagram of turning on/off a memory according to prior art.
Figure 2:
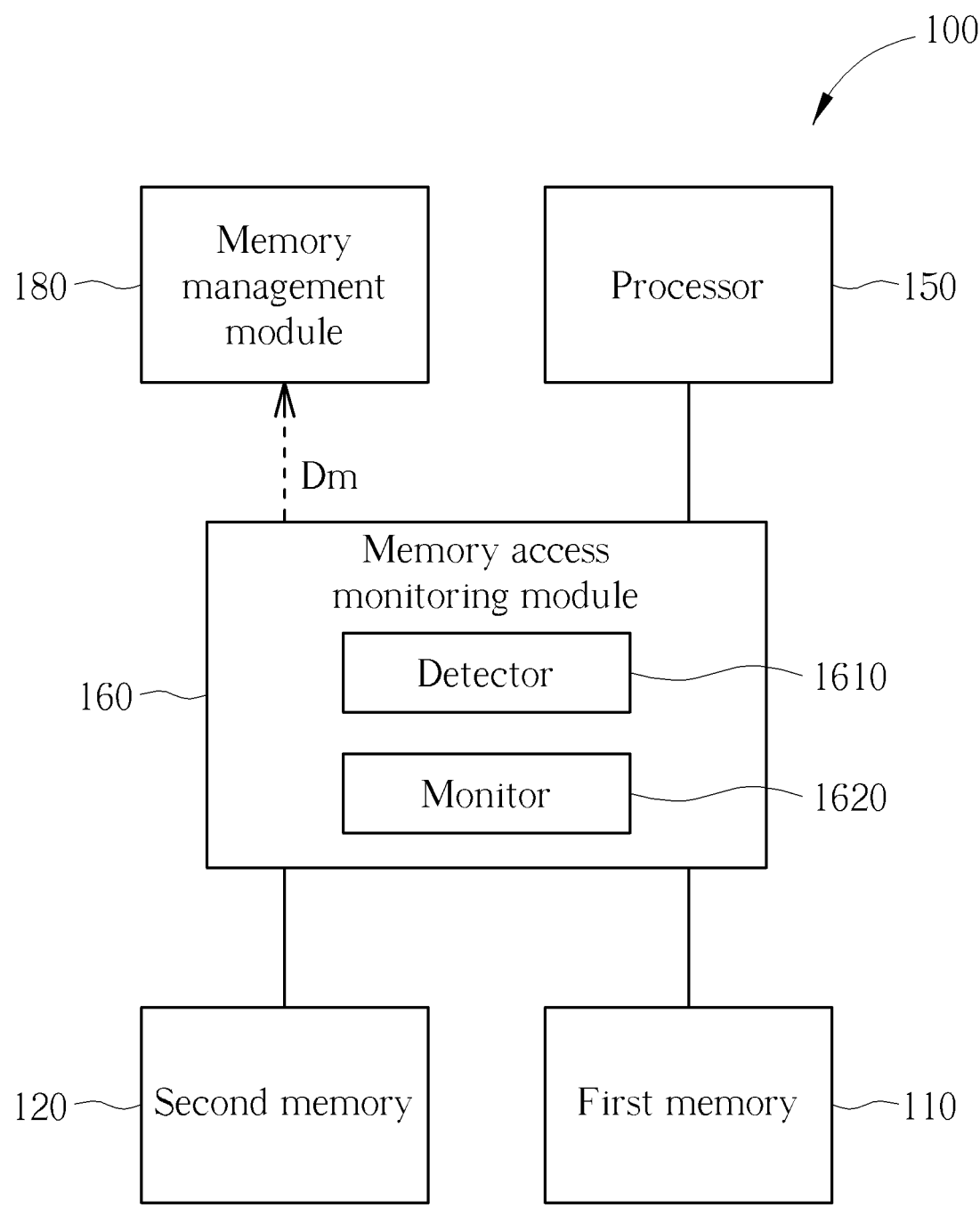
FIG. 2 illustrates a memory management system according to an embodiment.

FIG. 2 illustrates a memory management system 100 according to an embodiment. The memory management system 100 may include a first memory 110, a second memory 120, a processor 150, a memory access monitoring module 160 and a memory management module 180.

According to an embodiment, the first memory 110 may be (but not limited to) a dynamic random-access memory (DRAM), read-only memory (ROM), flash memory or static random-access memory (SRAM). The processor 150 may be (but not limited to) a central processing unit (CPU), graphics processing unit (GPU), microprocessor, microcontroller or a circuit with a process function. The memory access monitoring module 160 may be a circuit block embedded on a bus where the bus may be coupled between the processor 150 and the first memory 110. The memory management module 180 may be formed with software, hardware and/or firmware and used to execute a prediction algorithm.

The processor 150 may be used to access the first memory 110. The memory access monitoring module 160 include a first terminal coupled to the processor 150, and a second terminal coupled to the first memory 110. The memory access monitoring module 160 may be used to monitor whether the processor 150 has accessed the first memory 110 so as to generate monitor data Dm. For example, the memory access monitoring module 160 may monitor whether the processor 150 has accessed the first memory 110 by monitoring whether the processor 150 has transmitted an address corresponding to the first memory 110 according to an embodiment. The memory management module 180 may be used to receive the monitor data Dm and predict when the first memory 110 is to be accessed according to at least the monitor data Dm.

According to an embodiment, the memory access monitoring module 160 may include (but not limited to) a detector 1610 and a monitor 1620. The detector 1610 may be used to detect whether the processor 150 has accessed the first memory 110. The monitor 1620 may be used to record a start time and an end time of the first memory 110 being accessed by the processor 150. The monitor data Dm may be generated according to information collected by the detector 1610 and the monitor 1620.

After the first memory 110 is accessed a plurality of times, a plurality of genuine start times and a plurality of genuine end times of the first memory 110 being accessed may be collected, the memory management module 180 may predict when the first memory 110 is to be accessed according to experience.

According to an embodiment, when the memory management module 180 predicts the first memory 110 is to be accessed, the memory management module 180 may arrange the first memory 110 to be turned on. According to an embodiment, when the first memory 110 is to be accessed, but the first memory 110 is not turned on to be ready for being accessed, the memory management module 180 may control the processor 150 to perform a stall operation until the first memory 110 is turned on. In other words, the memory management module 180 may control the processor 150 to perform a stall operation to wait for that the first memory 110 to turn on. When the processor 150 performs the stall operation, the processor 150 may overall stall or merely pause a process of accessing the first memory 110. After the first memory 110 has been turned on, the processor 150 may resume operating or resume the process of accessing the first memory 110.

According to an embodiment, when the memory management module 180 predicts the first memory 110 is not to be accessed, the memory management module 180 may arrange the first memory 110 to be turned off.

According to an embodiment, when a memory is turned on, the memory may be controlled to enter an active mode or be provided with power. When a memory is turned off, the memory may be controlled to enter a self-refresh mode or a power-down mode, or be powered off.

According to an embodiment, the memory management module 180 may predict when the first memory 110 is to be accessed by machine learning using the monitor data Dm. As described above, the memory management module 180 may be used to execute the prediction algorithm for predicting when the first memory 110 is accessed.

According to embodiment, the memory management module 180 may further be used to revise a prediction made by the memory management module 180 using the monitor data Dm. In other words, as the memory management module 180 continuously receives the monitor data Dm from the memory access monitoring module 160, the memory management module 180 may keep improving the accuracy and the correctness of the prediction. An error value may exist between a prediction and a genuine time of the processor 150 accessing the first memory 150, however, the error value may be checked for machine learning and/or statistical calculation to improve and optimize subsequent predictions.

By means of recurrently predicting when the first memory 110 is to be accessed and checking genuine times of accessing the first memory 110, data may be obtained to make predictions more and more accurate. According to an embodiment, predicted times of turning on the first memory 110 may be more and more close to genuine times of turning on the first memory 110, and predicted times of turning off the first memory 110 may be more and more close to genuine times of turning off the first memory 110.

In regard to the second memory 120 shown in FIG. 2, the second memory 120 may be an SRAM, DRAM, ROM or flash memory. The memory access monitoring module 160 may further include a third terminal coupled to the second memory 120. The memory access monitoring module 160 may be further used to monitor whether the processor 150 has accessed the second memory 120 so as to expand the monitor data Dm. In other words, the monitor data Dm may include information of not only whether the first memory 110 is accessed but also whether the second memory 120 is accessed, and related time information.

According to an embodiment, the memory management module 180 may predict when the first memory 110 is to be accessed according to the monitor data Dm and an operation scenario. An operation scenario may be a condition of applying a set of device(s) and/or a set of program(s). For example, when a gyroscope sensor, a barometer sensor, a pedometer sensor and a thermometer sensor of a mobile device (e.g., a mobile phone) are enabled to be in use, this condition may be an operation scenario. In another example, when a set of mobile application programs are in use, this condition may be another operation scenario. Because times and frequency of turning on/off the first memory 110 may vary with operation scenarios, the memory management module 180 may predict when the first memory 110 is to be accessed according to the monitor data Dm and an operation scenario. The memory management module 180 may use a corresponding plan of time to make predictions when entering a different operation scenario. According to an embodiment, the detector 1610 may detect a set of device(s)/program(s) used with the first memory 110, and the monitor 1620 may record data volumes used by the device(s)/program(s). The information related to the used device(s)/program(s) collected by the detector 1610 and the monitor 1620 may be used by the memory management module 180 to determine a corresponding operation scenario. According to an embodiment, the monitor data Dm may also include information related to an operation scenario.

Figure 3:
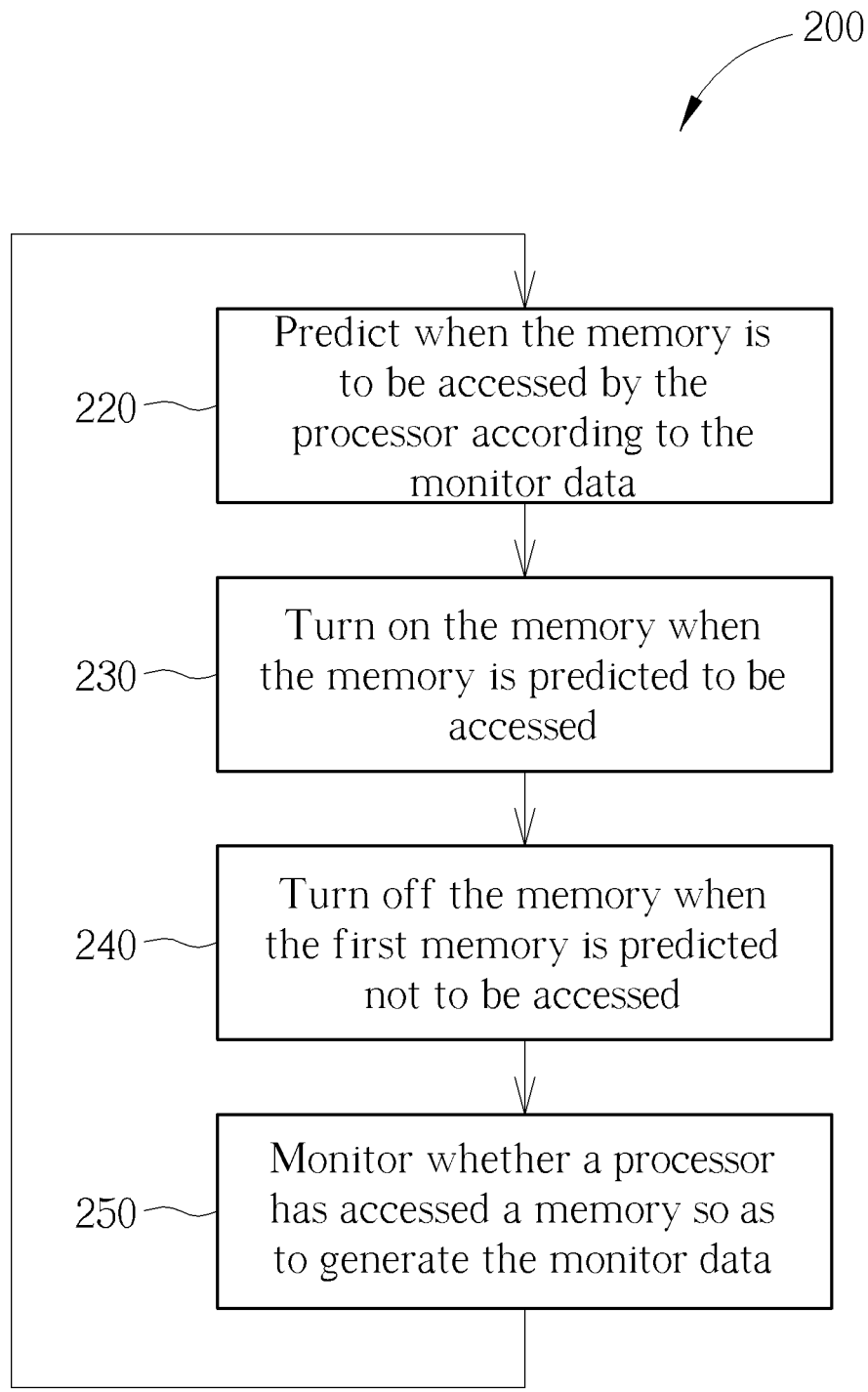
FIG. 3 illustrates a flowchart of a memory management method according to an embodiment.

FIG. 3 illustrates a flowchart of a memory management method 200 according to an embodiment. As shown in FIG. 2 and FIG. 3, the memory management method 200 may include following steps.

Step 220: predict when the first memory 110 is to be accessed by the processor 150 according to the monitor data Dm;

Step 230: turn on the first memory 110 when the first memory 110 is predicted to be accessed;

Step 240: turn off the first memory 110 when the first memory 110 is predicted not to be accessed; and Step 250: monitor whether the processor 150 has accessed the first memory 110 so as to generate the monitor data Dm.

According to an embodiment, as described above, Step 220 may be performed by the memory management module 180 of FIG. 2. Step 230 and Step 240 may be performed to turn on/off the first memory 110 according to predictions made by the memory management module 180. FIG. 3 merely provides an example, Step 240 may be performed before performing Step 230 if needed, and Step 230 and Step 240 may be performed by turns. Step 250 may be performed by the memory access monitoring module 160 of FIG. 2. According to an embodiment, the Step 250 may be concurrently performed when performing Step 230 and Step 240 for collecting and generating the monitor data Dm. For example, when Step 220 is performed at beginning, an initial default setting may be used to make the prediction, the default setting may be revised afterward according to the results of monitoring (e.g., the data Dm) obtained in Step 250, and the revised setting may then be used to make subsequent predictions. The method 200 of FIG. 3 may be performed repeatedly as a loop to constantly monitor the difference(s) between predicted time(s) and genuine time(s) of accessing the first memory 110 so as to constantly revise and optimize the prediction(s) accordingly. As mentioned above, the steps may be recurrently performed to improve accuracy of the predictions, and dynamic memory management may be achieved.

For example, the first memory 110 may have a larger storage capacity, a lower operation speed and higher power consumption. The second memory 120 may have a smaller storage capacity, a higher operation speed and lower power consumption. For example, the first memory 110 may be (but not limited to) a DRAM and the second memory 120 may be (but not limited to) an SRAM. According to an embodiment, the first memory 110 may be turned on/off according to the prediction(s) made by the memory management module 180, the second memory 120 may be turned off when the system 100 is suspended, and the second memory 120 may be turned on when the system 100 is woken up. However, this is merely an example instead of limiting the scope of embodiments.

Figure 4:
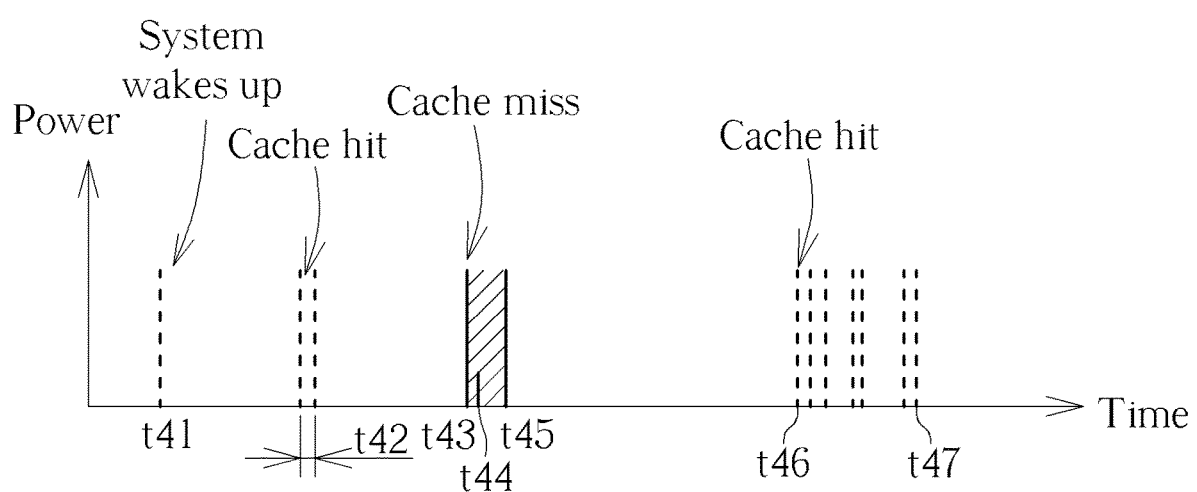
FIG. 4 illustrates a time diagram of turning on/off the first memory according to an embodiment.

FIG. 4 illustrates a time diagram of turning on/off the first memory 110 according to an embodiment. In FIG. 4, a horizontal axis corresponds to time, and a vertical axis corresponds to power provided to the first memory 110. In FIG. 4, at a time t41, the system 100 may wake up from a suspend mode (sleep mode) to enter a wake up mode. At a time t42, the processor 150 may try to access data, and the data may be found in a cache memory. In other words, a "cache hit" may occur at the time t42. According to prior art, the first memory 110 may be unnecessarily turned on without being used because the cache memory may be transparent for a program operating on the processor 150. However, as shown in FIG. 4, according to an embodiment, the first memory 110 may not be unnecessarily turned on at the time t42 because the memory management module 180 does not predict the first memory 100 is to be accessed at the time t42. The first memory 110 may be turned on at a time t43 and be turned off at a time t45 because the memory management module 180 may predict the first memory 100 is to be accessed after the time t43 and not to be accessed after the time t45. For example, at the time t43, the processor 150 may fail to find required data in the cache memory, so a "cache miss" may occur. Because the first memory 110 may be actually accessed from a time t44, and the time t44 comes after the time t43, the processor 150 may not need to execute a stall operation to wait for the first memory 100 to be turned on, and the operating speed of the system may be improved. Between a time t46 and a time t47, the first memory 110 may be not turned on because a cache hit may occur as shown in FIG. 4. However, according to prior art, the first memory 110 may be unnecessarily turned on from the time t46 to the time t47 because the system enters a wake up mode from the suspend mode, and the first memory 110 may be turned on without being accessed. According to the prediction(s) made by the memory management module 180, the memory 110 may be turned on in a little advance of starting accessing the memory 110, and an optimized time may be predicted to turn off the memory 110 to save power.

By means of the memory management system 100 and the memory management method 200, it may be avoided that the first memory 110 is unnecessarily turned on without being accessed, so power consumption may be reduced. By means of predictions beforehand, it may be avoided that the first memory 110 is turned on after the processor 150 transmits an address, so the time of waiting for the first memory 110 to wake up from a sleep mode may be reduced, and an operation speed of the system may be improved. Further, when the memory management system 100 is designed as a cacheable structure, it may be avoided to unnecessarily turn on the first memory 110 when required data has been obtained in a cache memory, where the cache memory may be a smaller and faster memory embedded between the processor 150 and a set of main memories including the memories 110 and 120, and the condition of obtaining the required data in the cache memory may be so-called cache hit. According to an embodiment, a memory may not be synchronously turned on/off when the system is woken up/suspended, so the excessive power consumption caused by unnecessarily turning on the memory may be reduced. In summary, by means of a memory management system and a memory management method provided by an embodiment, in a heterogeneous architecture, problems related to memory cost, power consumption and operating speed may be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory management system comprising:
    a first memory;
    a processor configured to access the first memory;
    a memory access monitoring module comprising a first terminal coupled to the processor, and a second terminal coupled to the first memory, the memory access monitoring module being configured to monitor whether the processor has accessed the first memory so as to generate monitor data; and
    a memory management module configured to receive the monitor data and predict when the first memory is to be accessed according to at least the monitor data,
    wherein when the memory management module predicts the first memory is to be accessed, the memory management module arranges the first memory to be turned on;
    when the memory management module predicts the first memory is not to be accessed, the memory management module arranges the first memory to be turned off; and
    a difference between a predicted time and a genuine time of accessing the first memory is obtained according to the monitor data and is used to revise a prediction made by the memory management module.

2. The memory management system of claim 1, wherein the memory access monitoring module further comprises:
    a detector configured to detect whether the processor has accessed the first memory; and
    a monitor configured to record a start time and an end time of the first memory being accessed by the processor;
    wherein the monitor data is generated according to information collected by the detector and the monitor.

3. The memory management system of claim 1, wherein the memory management module controls the processor to perform a stall operation or merely pause a process until the first memory is turned on.

4. The memory management system of claim 1, wherein the memory management module predicts when the first memory is to be accessed by machine learning using the monitor data.

5. The memory management system of claim 1 further comprising a second memory, wherein the memory access monitoring module further comprises a third terminal coupled to the second memory, the memory access monitoring module is further configured to monitor whether the processor has accessed the second memory so as to expand the monitor data.

6. The memory management system of claim 1, wherein the memory access monitoring module monitors whether the processor has accessed the first memory by monitoring whether the processor has transmitted an address corresponding to the first memory.

7. The memory management system of claim 1, wherein the first memory is a dynamic random-access memory, read-only memory, flash memory or static random-access memory.

8. The memory management system of claim 1, wherein the memory management module predicts when the first memory is to be accessed according to the monitor data and an operation scenario.

9. A memory management method comprising:
monitoring whether a processor has accessed a first memory so as to generate monitor data;
predicting when the first memory is to be accessed by the processor according to the monitor data;
turning on the first memory when the first memory is predicted to be accessed;
turning off the first memory when the first memory is predicted not to be accessed; and
revising a prediction according to a difference between a predicted time and a genuine time of accessing the first memory wherein the difference is obtained according to the monitor data.

10. The memory management method of claim 9, further comprising:
controlling the processor to perform a stall operation or merely pause a process until the first memory is turned on.

11. The memory management method of claim 9, wherein the monitor data is generated by:
detecting whether the processor has accessed the first memory; and
recording a start time and an end time of the first memory being accessed by the processor.

12. The memory management method of claim 9, wherein when the first memory is to be accessed by the processor is predicted by machine learning according to the monitor data.

13. The memory management method of claim 9, further comprising:
monitoring whether the processor has accessed second memory so as to expand the monitor data.

14. The memory management method of claim 9, wherein when the first memory is to be accessed by the processor is predicted according to the monitor data and an operation scenario.

* * * * *